(12) United States Patent
Huang et al.

(10) Patent No.: US 11,913,691 B2
(45) Date of Patent: Feb. 27, 2024

(54) ELECTRONIC EXPANSION VALVE AND THERMAL MANAGEMENT ASSEMBLY

(71) Applicant: Zhejiang Sanhua Intelligent Controls Co., Ltd., Shaoxing (CN)

(72) Inventors: Quanfeng Huang, Zhejiang (CN); Yingchong Lu, Zhejiang (CN); Rongrong Zhang, Zhejiang (CN); Dazhao Zha, Zhejiang (CN); Wei Zhang, Zhejiang (CN)

(73) Assignee: Zhejiang Sanhua Intelligent Controls Co., Ltd., Shaoxing (CN)

( * ) Notice: Subject to any disclaimer, the term of this patent is extended or adjusted under 35 U.S.C. 154(b) by 407 days.

(21) Appl. No.: 17/288,855

(22) PCT Filed: Jan. 13, 2020

(86) PCT No.: PCT/CN2020/071749
§ 371 (c)(1),
(2) Date: Apr. 26, 2021

(87) PCT Pub. No.: WO2020/156129
PCT Pub. Date: Aug. 6, 2020

(65) Prior Publication Data
US 2022/0003466 A1 Jan. 6, 2022

(30) Foreign Application Priority Data
Jan. 30, 2019 (CN) .......................... 201910089086.2

(51) Int. Cl.
*G01K 13/00* (2021.01)
*F25B 41/35* (2021.01)

(52) U.S. Cl.
CPC ........ *F25B 41/35* (2021.01); *F25B 2700/191* (2013.01); *F25B 2700/21174* (2013.01)

(58) Field of Classification Search
CPC ................ F25B 41/35; F25B 2700/191; F25B 2700/21174
(Continued)

(56) References Cited

U.S. PATENT DOCUMENTS

| 2,930,404 A | 3/1960 | Kowalski et al. |
| 4,860,763 A | 8/1989 | Härtl |
| 2016/0313037 A1 | 10/2016 | Takahashi |

FOREIGN PATENT DOCUMENTS

| CN | 103185426 A | * 7/2013 |
| CN | 104676078 A | 6/2015 |

(Continued)

OTHER PUBLICATIONS

PCT/CN2020/071749, Mar. 27, 2020, International Search Report and Written Opinion.
(Continued)

*Primary Examiner* — Davis D Hwu
(74) *Attorney, Agent, or Firm* — Wolf, Greenfield & Sacks, P.C.

(57) ABSTRACT

An electronic expansion valve and a thermal management assembly. The electronic expansion valve has a valve port and a valve core. A valve body includes a first flow portion, a second flow portion, a first cavity and a second cavity. The first flow portion comprises a first connection section and a first subsection, and the first subsection is directly in communication with the first cavity. The second flow portion comprises a second connection section and a second subsection, and the second subsection is directly in communication with the second cavity. In a clockwise direction, an angle formed between at least one of the center line of the first subsection and the center line of the second subsection and the center line of the valve core is an acute angle.

13 Claims, 12 Drawing Sheets

(58) Field of Classification Search
USPC .......................................................... 62/129
See application file for complete search history.

(56) References Cited

FOREIGN PATENT DOCUMENTS

| | | |
|---|---|---|
| CN | 106151552 A | 11/2016 |
| CN | 106151554 A | 11/2016 |
| CN | 104676078 B | 3/2017 |
| CN | 106482402 A | 3/2017 |
| CN | 207049366 U | 2/2018 |
| CN | 207364390 U | 5/2018 |
| CN | 209909196 U | 1/2020 |
| EP | 3 392 536 A1 | 10/2018 |
| FR | 2 598 789 A1 | 11/1987 |
| JP | S63-053367 A | 3/1988 |
| JP | H10-299934 A | 11/1998 |
| JP | 2001-027457 A | 1/2001 |
| JP | 2003-176965 A | 6/2003 |

OTHER PUBLICATIONS

EP20748955.0, May 25, 2022, Extended European Search Report.
JP2021-521349, Mar. 15, 2022, First Office Action.
International Search Report and Written Opinion for International Application No. PCT/CN2020/071749, dated Mar. 27, 2020.
Extended European Search Report for European Application No. 20748955.0, dated May 25, 2022.
First Office Action for Japanese Application No. 2021-521349, dated Mar. 15, 2022.

\* cited by examiner

ELECTRONIC EXPANSION VALVE AND THERMAL MANAGEMENT ASSEMBLY This Application is a national stage filing under 35 U.S.C. § 371 of International Patent Application Serial No. PCT/CN2020/071749, filed Jan. 13, 2020, which claims priority to Chinese patent application No. 201910089086.2, titled "ELECTRONIC EXPANSION VALVE AND THERMAL MANAGEMENT ASSEMBLY", filed with the China National Intellectual Property Administration on Jan. 30, 2019. These applications are incorporated herein by reference in their entirety.

FIELD

The present disclosure relates to the technical field of fluid control, and in particular to a thermal management assembly and an electronic expansion valve.

BACKGROUND

Referring to FIG. 1, FIG. 1 discloses a thermal management assembly 400'. The thermal management assembly 400' is able to be applied to an automotive air conditioning system, a heat pump system, and a battery cooling system. The thermal management assembly 400' includes a heat exchanger 500' and a thermal expansion valve 4', and the thermal expansion valve 4' and the heat exchanger 500' are integrated and assembled together through an adapter 501'. The thermal expansion valve 4' includes a first flow portion 41' and a second flow portion 42', the second flow portion 42' is connected to a connection pipe 5011' of the adapter 501', and the first flow portion 41' is connected to a connection pipe 10' of an external system. The thermal expansion valve 4' includes a valve cover 43', a membrane 44', and a transmission rod 45'. A medium cavity 47' is formed between the valve cover 43' and the membrane 44', and a power medium is filled inside the medium cavity 47'.

While the system is working, the power medium is able to receive the superheat of the working medium inside an outlet passage 5012' of the heat exchanger, which causes the power medium to expand or contract and act on the membrane 44' to generate an axial force, and then the axial force is transmitted to the transmission rod 45' directly or indirectly to enable the transmission rod 45' to move axially, and then the transmission rod 45' pushes a valve core component 46' to move with respect to a valve port 120', thereby changing an opening degree of the valve port 120' and further adjusting the flow of a refrigerant.

This method of driving by using the thermal characteristics of the power medium has relatively low response sensitivity, which results in relatively low flow control accuracy. Therefore, how to improve the flow control accuracy while keeping the relative positions of the connection pipe 5011' and the connection pipe 10' of the external system unchanged is a technical issue that requires to be considered in the design.

SUMMARY

An object of the present disclosure is to provide an electronic expansion valve. The electronic expansion valve is able to be matched and assembled with the connection pipe of the adapter and the connection pipe of the external system on one hand while the relative positions of the connection pipe and the connection pipe of the external system are kept unchanged, and on the other hand, the electronic expansion valve is beneficial to improving the flow control accuracy.

In order to achieve the above object, the following technical solution is provided according to an embodiment of the present disclosure.

An electronic expansion valve includes a valve body, a valve core, a rotor assembly, a stator assembly and a circuit board. The stator assembly is located on an outer circumference of the rotor assembly, and the stator assembly is electrically connected to the circuit board. The electronic expansion valve has a valve port, and the valve core is configured to move with respect to the valve port to adjust an opening degree of the valve port. The valve body includes a first flow portion and a second flow portion, at least part of the first flow portion is located above the valve port, and at least part of the second flow portion is located below the valve port. The electronic expansion valve has a first cavity and a second cavity, the first cavity is located above the valve port, and the second cavity is located below the valve port, the first flow portion is in communication with the first cavity, and the second flow portion is in communication with the second cavity. The first flow portion includes a first connection section and a first subsection, the first connection section is configured to connect with an external connection pipe, and the first subsection is in direct communication with the first cavity. The second flow portion includes a second connection section and a second subsection, the second connection section is configured to connect with an external connection pipe, and the second subsection is in direct communication with the second cavity. In a center line of the first subsection, part of the center line located in the first subsection is defined as a first line, and in a center line of the second subsection, part of the center line located in the second subsection is defined as a second line. A first cross section is obtained by cutting the electronic expansion valve along a section plane which passes through a center line of the valve core and flow paths of a working medium in the first flow portion and the second flow portion. On the first cross section, an angle clockwise formed between at least one of the first line and the second line and the center line of the valve core is an acute angle.

A thermal management assembly includes an electronic expansion valve and a heat exchanger, the electronic expansion valve is fixedly connected to the heat exchanger, and the electronic expansion valve is the electronic expansion valve described above.

In this way, the electronic expansion valve and the thermal management assembly are driven by an electromagnetic drive method, so that the rotor assembly is able to drive the valve core to move with respect to the valve port, and the electromagnetic drive method has relatively high response sensitivity, and is beneficial to improving the flow control accuracy. In addition, in the first flow portion, the first connection section is configured to connect with the external connection pipe, and the first subsection is in direct communication with the first cavity. In the second flow portion, the second connection section is configured to connect with the external connection pipe, and the second subsection is in direct communication with the second cavity. On the first cross section, the angle clockwise formed between at least one of the first line and the second line and the center line of the valve core is an acute angle. In this way, the electronic expansion valve is able to be matched and assembled with the connection pipe of the adapter and the connection pipe

DETAILED DESCRIPTION OF THE EMBODIMENTS

The present disclosure is further illustrated hereinafter in conjunction with drawings and specific embodiments.

In a refrigeration system, a throttling element is configured to control the flow of a refrigerant, and the throttling element mainly controls the flow of the refrigerant according to the change of the superheat of the system. Since an electronic expansion valve is driven by an electromagnetic drive method to control the flow of the refrigerant, the electromagnetic drive method has relatively high response sensitivity, and is beneficial to improving the flow control accuracy. In order to improve the flow control accuracy, the electronic expansion valve is gradually used as the throttling element in an automotive air conditioning system, a heat pump system and a battery cooling system.

Figure 2:
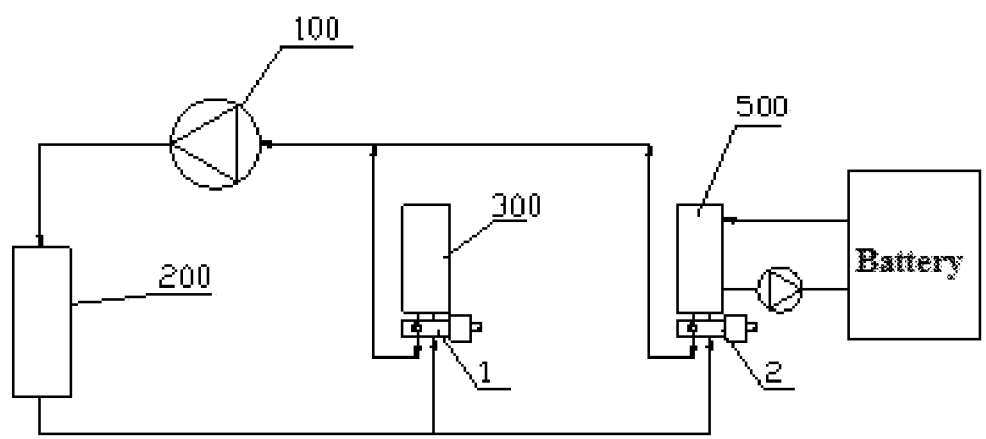
FIG. 2 is a schematic block diagram of a refrigeration system according to an embodiment of the present disclosure.

FIG. 2 is a schematic block diagram of a refrigeration system according to an embodiment of the present disclosure. In this embodiment, the refrigeration system includes an air conditioning system and a battery cooling system. The air conditioning system includes a compressor 100, a condenser 200, a first electronic expansion valve 1 and an evaporator 300. While the air conditioning system is working, a refrigerant is compressed into a high temperature and high pressure refrigerant by the compressor 100, and the high temperature and high pressure refrigerant becomes a normal temperature and high pressure refrigerant after passing through the condenser 200, and the normal temperature and high pressure refrigerant enters the evaporator 300 through the first electronic expansion valve 1. As the normal temperature and high pressure refrigerant is depressurized after passing through the first electronic expansion valve 1, the refrigerant vaporizes and becomes a low temperature refrigerant. The low temperature refrigerant passes through the evaporator 300 and absorbs a large amount of heat, and becomes the refrigerant and returns to the compressor 100. The battery cooling system includes the compressor 100, the condenser 200, a second electronic expansion valve 2, a heat exchanger 500, and a battery. While the battery cooling system is working, the refrigerant is compressed into a high temperature and high pressure refrigerant by the compressor 100, and the high temperature and high pressure refrigerant becomes a normal temperature and high pressure refrigerant after passing through the condenser 200, and the normal temperature and high pressure refrigerant enters the heat exchanger 500 through the second electronic expansion valve 1 and exchanges heat in the heat exchanger 500, and the refrigerant after the heat exchange through the heat exchanger 500 flows into the battery to cool the battery. In the refrigeration system, the first electronic expansion valve 1 and the evaporator 300 may be separately installed in the system pipeline as two independent components, or, the first electronic expansion valve 1 and the evaporator 300 may be integrated and assembled together and then installed on the system pipeline. Similarly, the second electronic expansion valve 2 and the heat exchanger 500 may be separately installed in the system pipeline as two independent components, or, the second electronic expansion valve 2 and the heat exchanger 500 may be integrated and assembled together and then installed on the system pipeline. For ease of description, the assembly in which the first electronic expansion valve 1 and the evaporator 300 are integrated and assembled, and the assembly in which the second electronic expansion valve 2 and the heat exchanger 500 are integrated and assembled are collectively referred to as the thermal management assembly.

Figure 3:
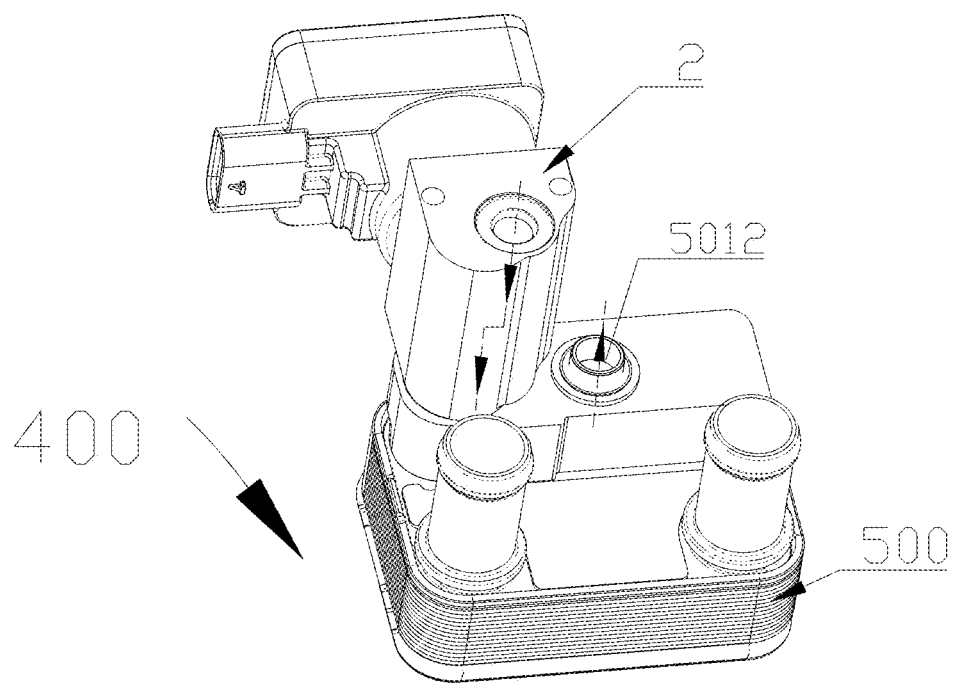
FIG. 3 is a schematic perspective view of a thermal management assembly according to an embodiment of the present disclosure.

FIG. 3 is a schematic structural view of a specific embodiment of the thermal management assembly. In this technical solution, the thermal management assembly 400 includes the heat exchanger 500 and the second electronic expansion valve 2, and the heat exchanger 500 and the second electronic expansion valve 2 are integrated as a whole. With reference to FIG. 2, in the present disclosure, the structure of the first electronic expansion valve 1 is the same as that of the second electronic expansion valve 2, and the first electronic expansion valve 1 and the second electronic expansion valve 2 are collectively referred to as the electronic expansion valve for description below. Apparently, the structure of the first electronic expansion valve may be different from that of the second electronic expansion valve, or the battery cooling system may not be provided with the electronic expansion valve. A technical solution falls within the scope of protection of the present disclosure as long as one of the first electronic expansion valve and the second electronic expansion valve of the technical solution has the same structure as the electronic expansion valve of the present disclosure.

Figure 4:
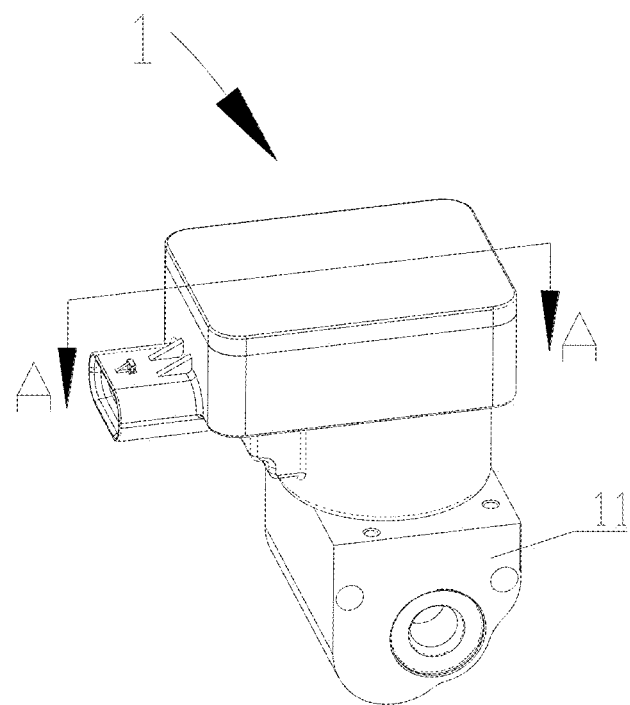
FIG. 4 is a schematic perspective view of the electronic expansion valve in FIG. 3.
Figure 5:
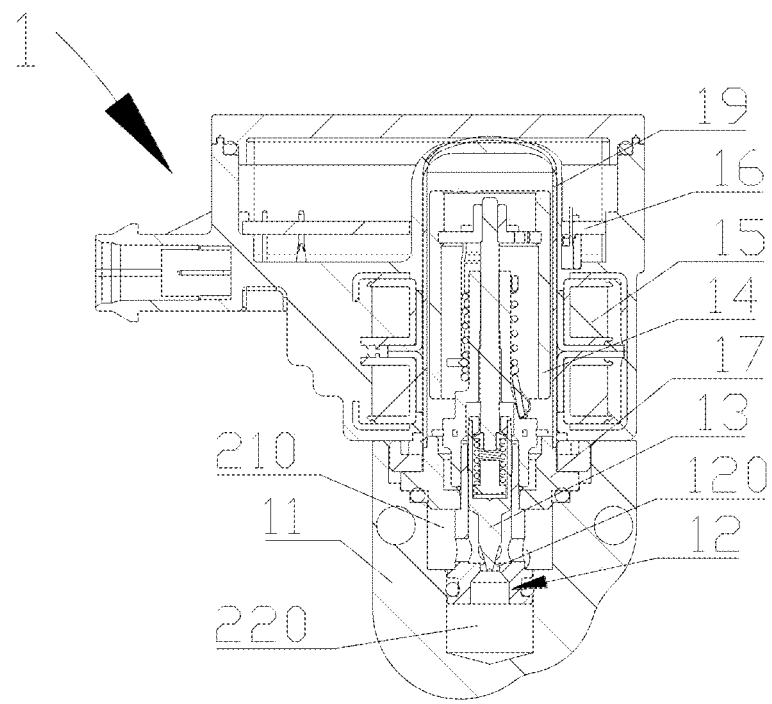
FIG. 5 is a schematic sectional view of the electronic expansion valve in FIG. 4 taken along line A-A.

Referring to FIG. 4 and FIG. 5, the electronic expansion valve 1 includes a valve body 11, a valve core 13, a rotor assembly 14, a stator assembly 15 and a circuit board 16. The electronic expansion valve 1 further includes a valve port 120, and the valve port 120 is able to communicate flow passages on two sides of the valve port 120 with each other. The stator assembly 15 is sleeved on an outer circumference of the rotor assembly 14. In this embodiment, a sleeve 19 is provided between the stator assembly 15 and the rotor assembly 14 to isolate the stator assembly 15 from the rotor assembly 14, and the stator assembly 15 is electrically and/or signal connected to the circuit board 16. While the electronic expansion valve 1 is working, the stator assembly 15 is controlled to generate a varying excitation magnetic field by controlling an electric current passing through the stator assembly 15 to change according to a predetermined rule, the rotor assembly 14 rotates under the action of the excitation magnetic field, and the rotor assembly 14 is able to drive the valve core 13 to move with respect to the valve port 120, adjusting an opening degree of the valve port 120. In this way, the rotor assembly is able to drive the valve core to move with respect to the valve port by an electromagnetic drive method, and the electromagnetic drive method has relatively high response sensitivity, and is beneficial to improving the flow control accuracy.

Referring to FIG. 4 and FIG. 5, the electronic expansion valve 1 further includes a valve seat 12, and the valve seat 12 is arranged on an outer circumference of the valve core 13 and is position-limited thereto. In this embodiment, the valve port 120 is formed on the valve seat 12, and the valve core 13 is configured to change a flow cross-sectional area of a working medium at the valve port 120 by approaching and moving away from the valve port 120, thereby throttling the working medium at the valve port 120. Referring to FIG. 5, the electronic expansion valve 1 further includes a connection member 17, the sleeve 19 is arranged on an outer circumference of the rotor assembly 15, the sleeve 19 is fixed to the connection member 17 by welding, and the valve seat 12 is fixedly connected with the connection member 17, that is, the sleeve 19 is connected to the valve seat 12 by the connection member 17, which simplifies the mold, miniaturizes the mold, and facilitates the forming of the valve seat 12. Apparently, the connection member 17 may be integrally formed with the valve seat 12, so that there is no need to additionally connect the connection member 17 with the valve seat 12.

Figure 8:
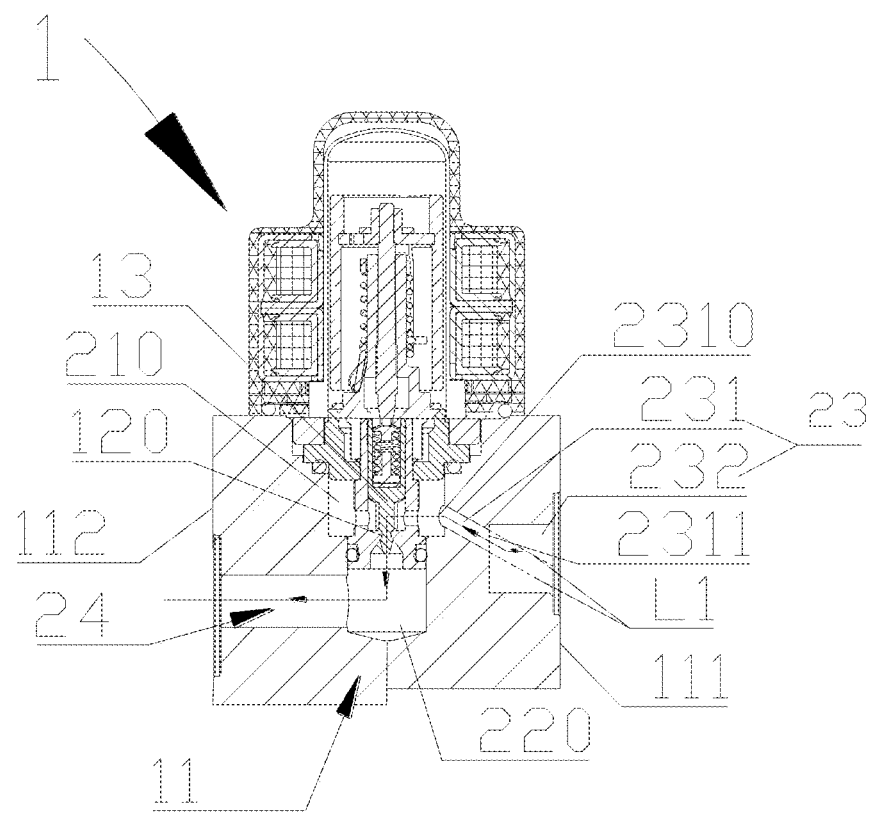
FIG. 8 is a sectional view of the electronic expansion valve in FIG. 7 taken along line B-B.

Referring to FIG. 5 and FIG. 8, the electronic expansion valve 1 has a first cavity 210 and a second cavity 220, the first cavity 210 is located above the valve port 120, and the second cavity 220 is located below the valve port 120. The working medium is able to flow through the first cavity 210 and the second cavity 220.

Figure 1:
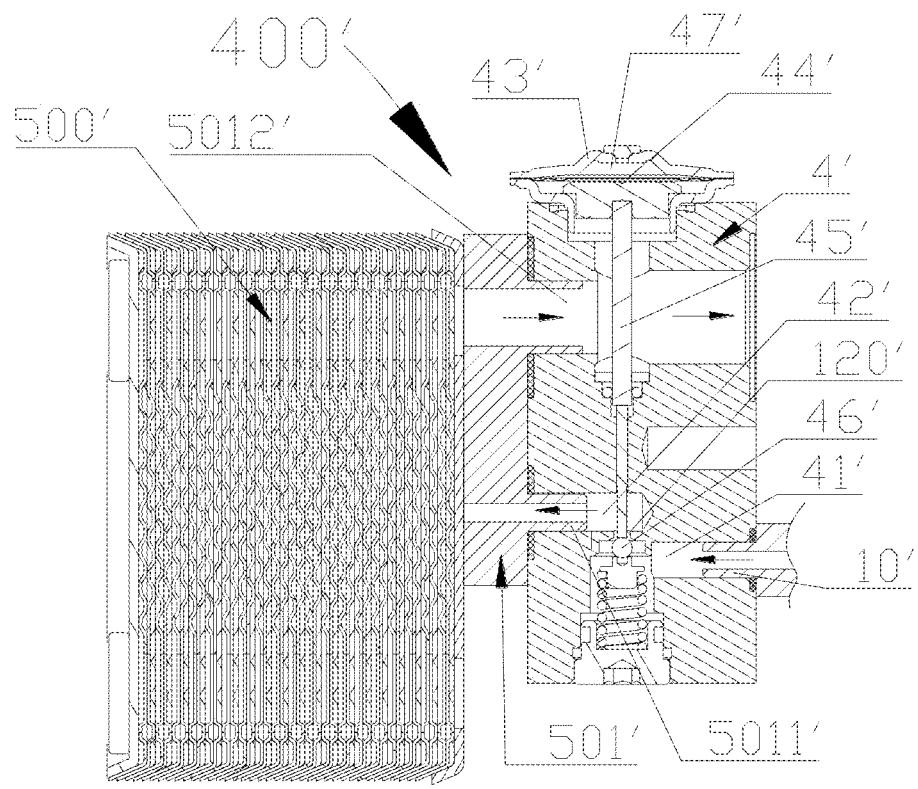
FIG. 1 is a schematic sectional view of a thermal management assembly in the conventional technology.

In the present disclosure, the electronic expansion valve includes a first flow portion and a second flow portion. Specifically, the first flow portion and the second flow portion are formed in the valve body, and the working medium in the first flow portion is able to communicate with the working medium in the second flow portion, at least part of the first flow portion is located above the valve port, and at least part of the second flow portion is located below the valve port, so that the working medium is able to be throttled at the valve port. The valve body includes a first wall surface and a second wall surface, and the first wall surface and the second wall surface are respectively located on two sides of the valve body. The first flow portion includes a first connection section and a first subsection, the first connection section is perpendicular to the first wall surface, the first connection section is configured to connect with an external connection pipe, and the first subsection is in direct communication with the first cavity. The second flow portion includes a second connection section and a second subsection, the second connection section is perpendicular to the second wall surface, the second connection section is configured to connect with an external connection pipe, and the second subsection is in direct communication with the second cavity, so that the connection pipe 5011' of the adapter and the connection pipe 10' of the external system in FIG. 1 are able to be installed horizontally. In addition, in a case that the connection pipe 5011' of the adapter and the connection pipe 10' of the external system in FIG. 1 are not installed horizontally, the first connection section is not perpendicular to the first wall surface, and the second connection section is not perpendicular to the second wall surface. In a center line of the first subsection, part of the center line located in the first subsection is defined as a first line, and in a center line of the second subsection, part of the center line located in the second subsection is defined as a second line. A first cross section is obtained by cutting the electronic expansion valve along a section plane which passes through a center line of the valve core and flow paths of the working medium in the first flow portion and the second flow portion. On the first cross section, an angle clockwise formed between at least one of the first line and the second line and the center line of the valve core is an acute angle. While the relative positions of the connection pipe 5011' of the adapter and the connection pipe 10' of the external system in FIG. 1 are kept unchanged, the first flow portion can be in communication with the first cavity and/or the second flow portion can be in communication with the second cavity through the inclined arrangement, so that the working medium can flow into the first cavity and/or the second cavity, which enables the electronic expansion valve to be matched and assembled with the connection pipe of the adapter and the connection member of the external system. In addition, in the present disclosure, the first flow portion is used as an inflow end of the working medium, and the second flow portion is used as an outflow end of the working medium. In a case that the electronic expansion valve is used in an automotive air conditioning system, and/or a heat pump system, and/or a battery cooling system, the high pressure working medium flows from the first flow portion to the first cavity. With reference to FIG. 5, since the rotor assembly 14 is able to drive the valve core 13 to move with respect to the valve port 120 to adjust the opening degree of the valve port 120, the working medium in the first cavity is able to be throttled at the valve port, and the working medium after the throttling flows into the second cavity. Since the second flow portion is in communication with the second cavity, the working medium in the second cavity is able to flow out of the second flow portion.

In view of the above description, six embodiments of the thermal management assembly and the electronic expansion valve are provided according to the present disclosure, and the structures of the six embodiments of the thermal management assembly and the electronic expansion valve will be described in detail below.

In order to facilitate the description of the thermal management assembly and the electronic expansion valve of the six embodiments, the electronic expansion valve of the first embodiment is denoted as 1, and the thermal management assembly is denoted as 400, and no suffixes are added to other numerals. The electronic expansion valve of the second embodiment is denoted as 1a, and the thermal management assembly is denoted as 400a, and all other numerals are suffixed with "a". The electronic expansion valve of the third embodiment is denoted as 1b, and the thermal management assembly is denoted as 400b, and all other numerals are suffixed with "b". The electronic expansion valve of the fourth embodiment is denoted as 1c, and the thermal management assembly is denoted as 400c, and all other numerals are suffixed with "c". The electronic expansion valve of the fifth embodiment is denoted as 1d, and the thermal management assembly is denoted as 400d, and all other numerals are suffixed with "d". The electronic expansion valve of the sixth embodiment is denoted as 1e, and the thermal management assembly is denoted as 400e, and all other numerals are suffixed with "e".

Figure 6:
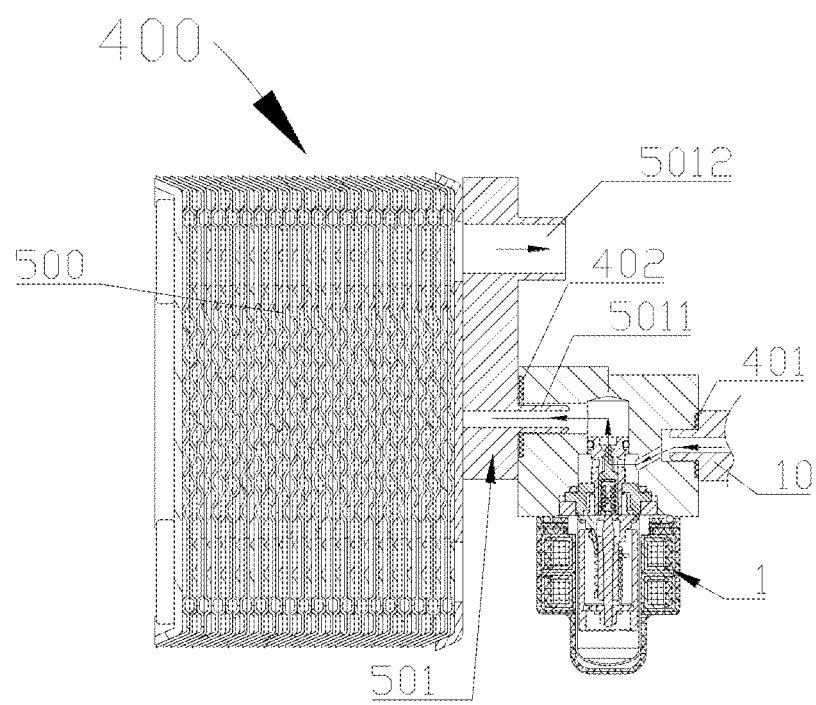
FIG. 6 is a schematic sectional view of the thermal management assembly according to a first embodiment of the present disclosure.
Figure 7:
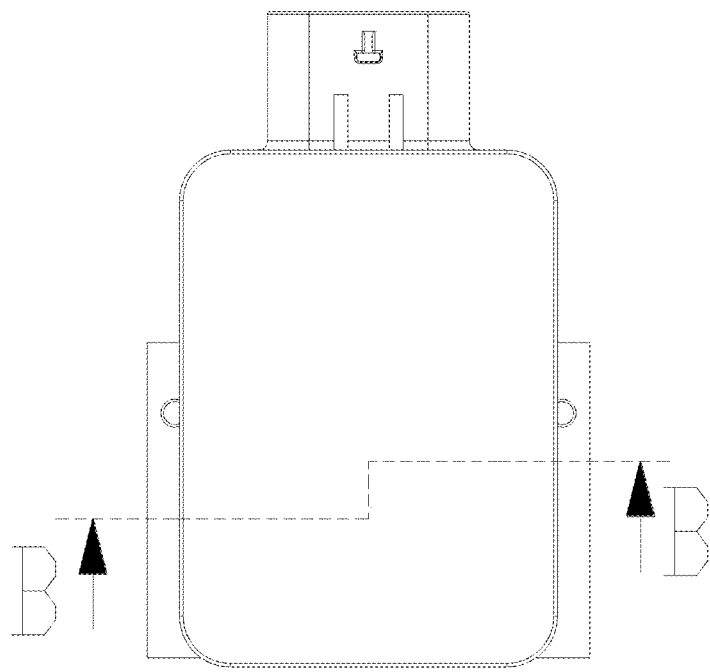
FIG. 7 is a schematic front view of the electronic expansion valve in FIG. 6.
Figure 9:
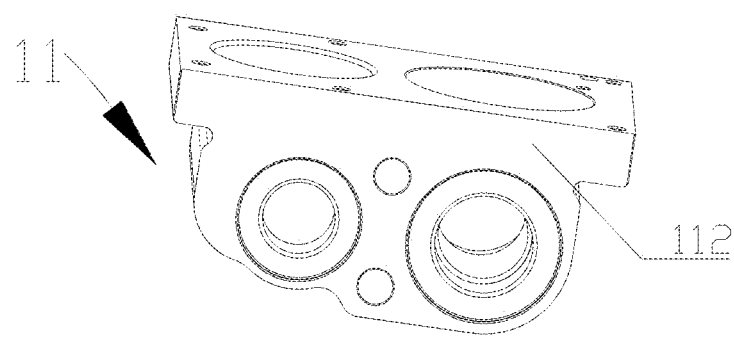
FIG. 9 is a schematic perspective view of the valve body in FIG. 7 or FIG. 8.
Figure 10:
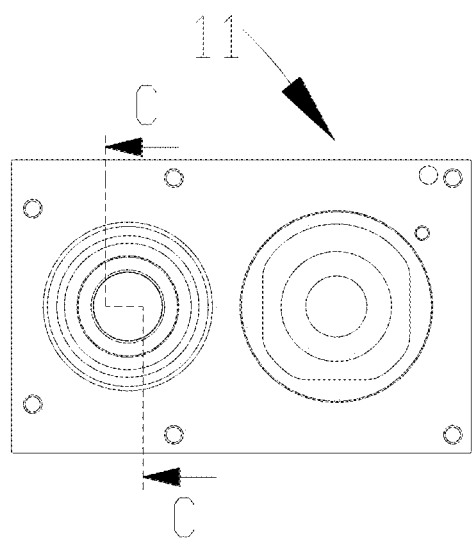
FIG. 10 is a schematic front view of the valve body in FIG. 9.
Figure 11:
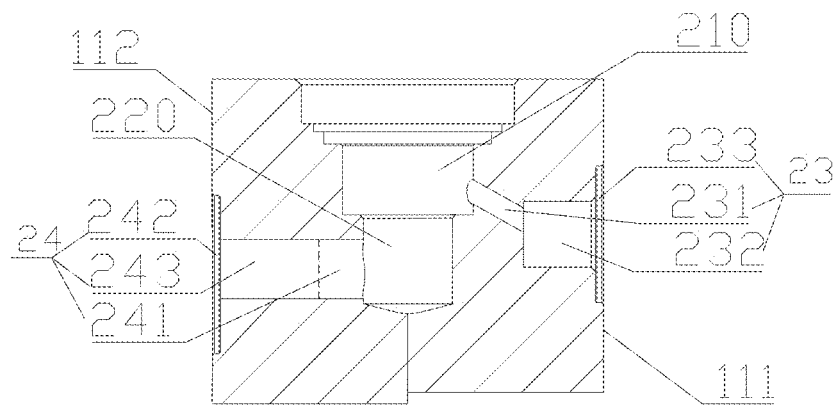
FIG. 11 is a sectional view of the valve body in FIG. 10 taken along line C-C.

Referring to FIG. 6, FIG. 6 is a schematic structural view of the thermal management assembly of the first embodiment in the technical solution. FIG. 7 and FIG. 8 are schematic structural views of the electronic expansion valve in FIG. 6. FIGS. 9 to 11 are schematic structural views of the valve body in FIG. 7 or FIG. 8. The structure of the electronic expansion valve of the first embodiment will be described in detail below.

Referring to FIG. 6, the thermal management assembly 400 includes a heat exchanger 500 and an electronic expansion valve 1, and the heat exchanger 500 and the electronic expansion valve 1 are integrated as a whole. Specifically, the heat exchanger 500 and the electronic expansion valve 1 are integrated and assembled into a whole through an adapter 501. Referring to FIGS. 6 to 11, a valve body 11 includes a first flow portion 23 and a second flow portion 24, the first flow portion 23 includes a first subsection 231 and a first connection section 232, the first subsection is 231 in communication with the first connection section 232, the first subsection 231 is closer to a valve port 120 than the first connection section 232, and the first subsection 231 is in communication with a first cavity 210. Referring to FIG. 8, the valve body 11 includes a first wall surface 111 and a second wall surface 112, and the first wall surface 111 and the second wall surface 112 are respectively located on two sides of the valve body 11. In the first flow portion 23, the first connection section 232 is perpendicular to the first wall surface 111, and the first connection section 232 is configured to connect with an external connection pipe 10 in FIG. 6. In this embodiment, a center line of the first connection section 232 is perpendicular to a center line of a valve core 13, and a flow cross-sectional area of the first connection section 232 is greater than a flow cross-sectional area of the working medium in the first subsection 231, which is beneficial to reducing the flow resistance. A first cross section is obtained by cutting the electronic expansion valve 1 along a section plane which passes through the center line of the valve core 13 and flow paths of the working medium in the first flow portion 23 and the second flow portion 24. In a center line of the first subsection 231, part of the center line located in the first subsection 231 is defined as a first line. On the first cross section, an angle clockwise formed between the first line and the center line of the valve core 13 is an acute angle. With such inclined arrangement, the first flow portion 23 can be communicated with the first cavity 210, so that the working medium can flow into the first cavity 210, and while the relative positions of the connection pipe 5011' of the adapter and the connection pipe 10' of the external system in FIG. 1 are kept unchanged, the electronic expansion valve is able to replace the conventional thermal expansion valve and be further matched and assembled with the connection pipe of the adapter and the connection member of the external system in FIG. 1 by adjusting the relative position, with the position of the second flow portion 24 as a reference, of the first flow portion 23, which also improves the flow control accuracy.

Referring to FIG. 8, on the first cross section, an extension line L1 of the first subsection 231 extending toward the first connection section 232 does not intersect the first connection section 232, such that a drill will not damage the structure of the first connection section 232 while the first subsection 231 is processed. In this embodiment, the first connection section 232 is configured to connect with the external connection pipe.

Referring to FIGS. 5, 6, 8 and 11, the flow cross-sectional area of the first subsection 231 is greater than a flow cross-sectional area of the valve port 120, which prevents the working medium from being throttled at the first subsection 231. Along an extension direction of the first subsection 231, a distance between the first subsection 231 and a circumferential side wall 211 of the first cavity 210 is greater than or equal to 2 mm, which is beneficial to ensuring the structural strength of the first subsection 231. In addition, in this embodiment, while the electronic expansion valve 1 is working, the working medium flows from an outlet port 2310 of the first subsection 231 into the first cavity 210, and an inlet port 2311 of the first subsection 231 is formed on a bottom surface of the first connection section 232, which is beneficial for the processing of the first subsection 231.

Referring to FIGS. 8 and 11, the first flow portion 23 further includes a first accommodating portion 233, and the first accommodating portion 233 has an accommodating cavity. An open end of the first accommodating portion 233 is formed on the first wall surface 111 of the valve body 11, the first accommodating portion 233 is in communication with the first connection section 232, and a diameter of the first accommodating portion 233 is greater than a diameter of the first connection section 232. With reference to FIG. 6, the accommodating cavity of the first accommodating portion 233 is configured to place a first sealing ring 401 in FIG. 6, to prevent the working medium from leaking at the connection between the first connection section 232 and the external connection pipe 10 in FIG. 6.

Referring to FIGS. 8 and 11, the second flow portion 24 includes a second connection section 243 and a second subsection 241, the second connection section 243 is perpendicular to the second wall surface 112, the second connection section 242 is configured to connect with an external connection pipe 5011 in FIG. 6, and the second subsection 242 is in direct communication with the second cavity 220. In this embodiment, the second connection section 243 and the second subsection 241 are the same section. In order to facilitate the description of the second connection section and the second subsection, referring to FIG. 11, a dotted line is introduced as a dividing line between the second subsection 241 and the second connection section 243. In this embodiment, the second subsection 241 is on the right side of the dotted line in FIG. 11, and the second connection section 243 is on the left side of the dotted line in FIG. 11, and the second connection section 243 and the second subsection 241 are the same section. Specifically, the flow cross-sectional area throughout the second connection section 243 is equal to the flow cross-sectional area throughout the second subsection 241, the second connection section 243 and the second subsection 241 are located below the valve port 120 in FIG. 8, and the flow cross-sectional area of the second subsection 241 is greater than the flow cross-sectional area of the valve port 120, which prevents the flow from being adversely affected due to the secondary throttling at the second subsection 241.

Referring to FIG. 11, the second flow portion 24 further includes a second accommodating portion 242. An open end of the second accommodating portion 242 is formed on the second wall surface 112, the second accommodating portion 242 is in communication with the second connection section 243, and a diameter of the second accommodating portion 242 is greater than a diameter of the second connection section 243. With reference to FIG. 6, the second accommodating portion 242 is configured to place a second sealing ring 402, to prevent the working medium from leaking at the connection between the second connection section 243 and the connection pipe 5011 of the connection member 501.

Referring to FIGS. 8 and 11, the flow cross-sectional area of the first subsection 231 is smaller than the flow cross-sectional area of the second subsection 241. Since the liquid high pressure working medium first flows into the first cavity 210 through the first subsection 231 and then is throttled by the valve port 120, on one hand, the high pressure working medium is depressurized, and on the other hand, the liquid working medium transforms into a gas-liquid mixed working medium, and the flow rate of the working medium in the second subsection 241 is higher than the flow rate of the working medium in the first subsection 231, and the flow cross-sectional area of the working medium in the first subsection 231 is smaller than the flow cross-sectional area of the working medium in the second subsection 241, which is beneficial to improving the flow stability of the working medium and further reduces the generation of a vortex.

Referring to FIGS. 3, 6 and 8, in this embodiment, the working medium flows in through the first flow portion 23, and the working medium after being throttled by the valve port 120 then flows into the heat exchanger 500 from the second flow portion 24, and the working medium after the heat exchange through the heat exchanger 500 flows out from an outlet passage 5012 of the adapter 501. In this embodiment, a sensor is generally arranged close to the outlet passage 5012 of the adapter 501 to collect related parameters (such as temperature and/or pressure, etc.) of the working medium at an outlet of the heat exchanger 500. The sensor is connected to a control unit in the system through a wire harness, and the control unit in the system adjusts the opening degree of the electronic expansion valve according to the corresponding control program after obtaining the related parameters.

Figure 12:
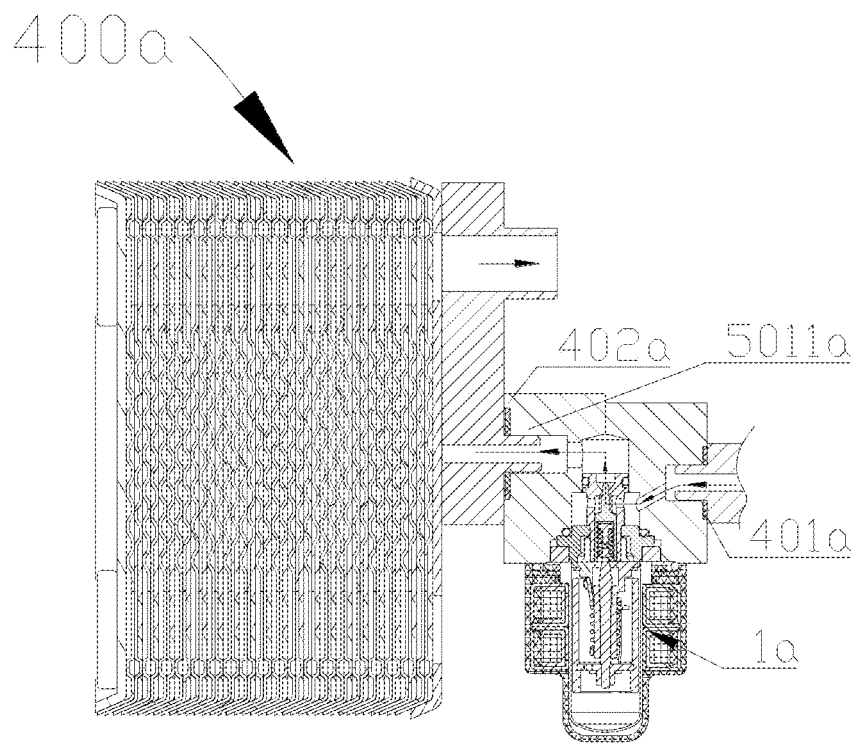
FIG. 12 is a schematic sectional view of the thermal management assembly according to a second embodiment of the present disclosure.
Figure 13:
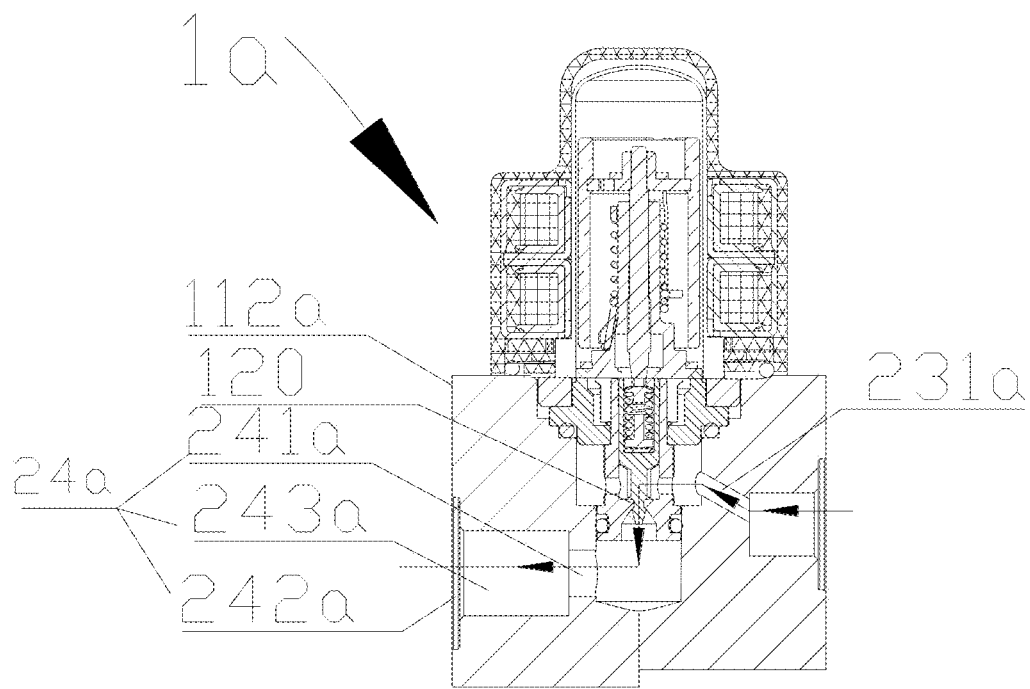
FIG. 13 is a schematic sectional view of the electronic expansion valve in FIG. 12.

Referring to FIG. 12, FIG. 12 is a schematic structural view of the thermal management assembly of the second embodiment in the technical solution. FIG. 13 is a schematic structural view of the electronic expansion valve in FIG. 12. The structure of the electronic expansion valve of the second embodiment will be described in detail below.

Referring to FIGS. 12 and 13, a second flow portion 24a includes a second subsection 241a and a second connection section 243a, the second connection section 243a is in direct communication with the second subsection 241a, and the second subsection 241a is closer to a valve port 120 than the second connection section 243a. The second subsection 241a and the second connection section 243a are located below the valve port 120, and a flow cross-sectional area of the second subsection 241a is greater than a flow cross-sectional area of the valve port 120, which prevents the flow from being adversely affected due to the secondary throttling at the second subsection 241a. Besides, a flow cross-sectional area of the second connection section 243a is greater than a flow cross-sectional area of the second subsection 241a, which is beneficial to reducing the flow resistance. In this embodiment, the second subsection 241a and the second connection section 243a are sections with different diameters.

Referring to FIG. 13, the second flow portion 24a further includes a second accommodating portion 242a. An open end of the second accommodating portion 242a is formed on the second wall surface 112a, the second accommodating portion 242a is in communication with the second connection section 243a, and a diameter of the second accommodating portion 242a is greater than a diameter of the second connection section 243a. The second accommodating portion 242a is configured to place a second sealing ring 402, to prevent the working medium from leaking at the connection between the second connection section 243a and a connection pipe 5011a of an adapter.

Compared with the thermal management assembly and the electronic expansion valve of the first embodiment, in this embodiment, the second subsection 241a and the second connection section 243a are sections with different diameters. In this embodiment, as for other structures of the electronic expansion valve, reference may be made to the electronic expansion valve of the first embodiment, which will not be repeated here.

Figure 14:
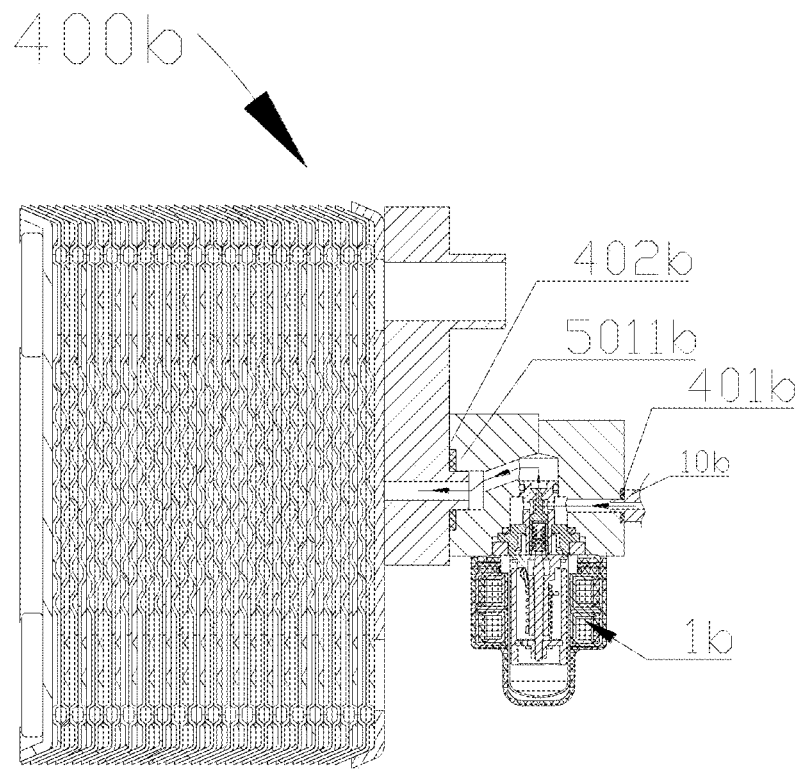
FIG. 14 is a schematic sectional view of the thermal management assembly according to a third embodiment of the present disclosure.
Figure 15:
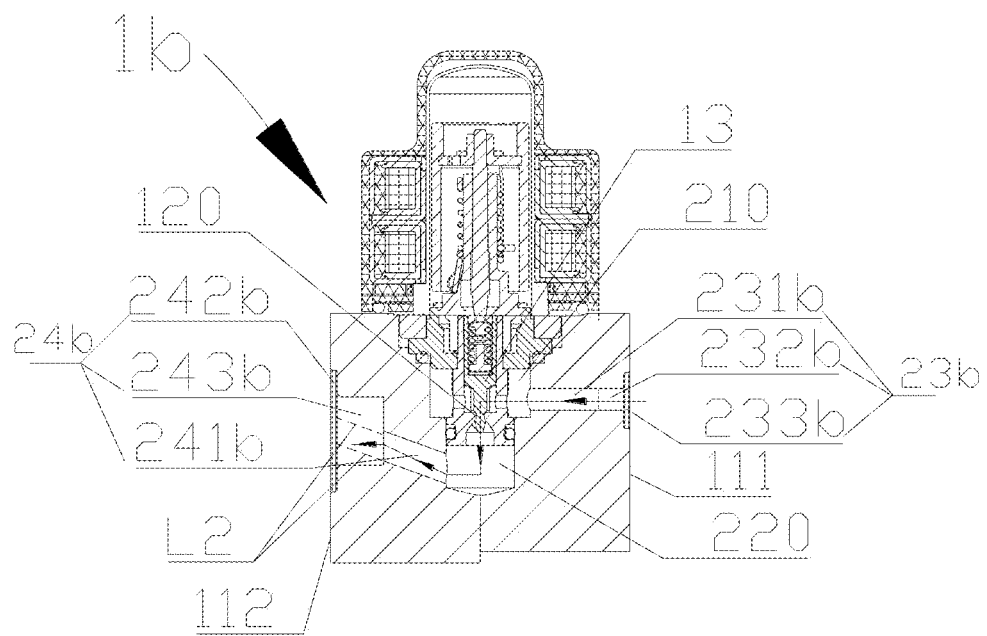
FIG. 15 is a schematic sectional view of the electronic expansion valve in FIG. 14.

Referring to FIG. 14, FIG. 14 is a schematic structural view of the thermal management assembly of the third embodiment in the technical solution. FIG. 15 is a schematic structural view of the electronic expansion valve in FIG. 14. The structure of the electronic expansion valve of the third embodiment will be described in detail below.

Referring to FIGS. 14 and 15, a second flow portion 24b includes a second subsection 241b and a second connection section 243b, the second subsection 241b is in communication with the second connection section 243b, and the second subsection 241b is closer to a valve port 120 than the second connection section 243b. The second connection section 243b is perpendicular to a second wall surface 112, and the second connection section 243b is configured to connect with a connection pipe 5011b of an adapter. A flow cross-sectional area of the second connection section 243b is greater than a flow cross-sectional area of the second subsection 241b. A first cross section is obtained by cutting the electronic expansion valve 1 along a section plane which passes through the center line of the valve core 13 and flow paths of the working medium in the first flow portion 23 and the second flow portion 24. On the first cross section, in a center line of the second subsection 241b, part of the center line located in the second subsection 241b is defined as a second line, and an angle clockwise formed between the second line and the center line of the valve core 13 is an acute angle. With such inclined arrangement, the second flow portion 24b can be communicated with the second cavity 220, so that the working medium can flow into the second cavity 220, and while the relative positions of the connection pipe of the adapter and the connection member of the external system in FIG. 1 are kept unchanged, the electronic expansion valve is able to replace the conventional thermal expansion valve and be further matched and assembled with the connection pipe of the adapter and the connection pipe of the external system in FIG. 1 by adjusting the relative position, with the position of the first flow portion 23b as a reference, of the second flow portion 24b, which also improves the flow control accuracy.

Referring to FIGS. 14 and 15, on the first cross section, an extension line L2 of the second subsection 241b extending toward the second connection section 243b does not intersect the second connection section 243b, such that a drill will not damage the structure of the second connection section 243b while the second subsection 241b is processed. In this embodiment, the second connection section 241b is configured to connect with the external connection pipe 10b.

Referring to FIGS. 14 and 15, the flow cross-sectional area of the second subsection 241b is greater than a flow cross-sectional area of the valve port 120, which prevents the working medium from being throttled at the second subsection 241b and the flow from being adversely affected. Along an extension direction of the second subsection 241b, a distance between the second subsection 241b and a circumferential side wall of the second cavity 220 is greater than or equal to 2 mm, which is beneficial to ensuring the structural strength of the second subsection 241b.

Referring to FIGS. 14 and 15, the first flow portion 23b includes a first subsection 231b and a first connection section 232b, the first connection section 232b is perpendicular to the first wall surface 111, the first connection section 232b is configured to connect with an external connection pipe, and the first subsection 231b is in direct communication with the first cavity 210. In this embodiment, the first subsection 231b and the first connection section 232b are the same section. In order to facilitate the description of the first subsection 231b and the first connection section 232b, referring to FIG. 15, in this embodiment, the first connection section 232b is on the right side of the dotted line in FIG. 15, and the first subsection 231b is on the left side of the dotted line in FIG. 15, and the first subsection 231b and the first connection section 232b are the same section. Specifically, the flow cross-sectional area throughout the first subsection 231b is equal to the flow cross-sectional area throughout the first connection section 232b, the first subsection 231b and the first connection section 232b are located above the valve port 120, and the flow cross-sectional area of the first subsection 231b is greater than the flow cross-sectional area of the valve port 120, which prevents the flow from being adversely affected due to the secondary throttling at the first subsection 231b.

Referring to FIGS. 14 and 15, the first flow portion 23b further includes a first accommodating portion 233b, and the first accommodating portion 233b is in communication with the first connection section 232b, and a diameter of the first accommodating portion 233b is greater than a diameter of the first connection section 232b. With reference to FIGS. 14 and 15, the first accommodating portion 233b has an accommodating cavity, the accommodating cavity is configured to place a first sealing ring 401b, to prevent the working medium from leaking at the connection between the first flow portion 23b and the external connection pipe 10b. The second flow portion 24b further includes a second accommodating portion 242b. The second accommodating portion 242b is in communication with the second connection section 243b, and a diameter of the second accommodating portion 242b is greater than a diameter of the second connection section 243b. The second accommodating portion 242b is configured to place a second sealing ring 402b, to prevent the working medium from leaking at the connection between the second flow portion 24b and the connection pipe 5011b of the adapter.

Compared with the thermal management assembly and the electronic expansion valve of the first embodiment, in this embodiment, in the center line of the second subsection 241b, part of the center line located in the second subsection 241b is defined as the second line, an angle clockwise formed between the second line and the center line of the valve core 13 is an acute angle, and the first flow portion 23b is a straight section. Compared with the thermal management assembly and the electronic expansion valve of the first embodiment, in this embodiment, the electronic expansion valve is able to replace the conventional thermal expansion valve and be further matched and assembled with the connection pipe of the adapter and the connection pipe of the external system in FIG. 1 by adjusting the relative position, with the position of the first flow portion 23b as a reference, of the second flow portion 24b. In this embodiment, as for other structures of the electronic expansion valve, reference may be made to the electronic expansion valve of the first embodiment, which will not be repeated here.

Figure 16:
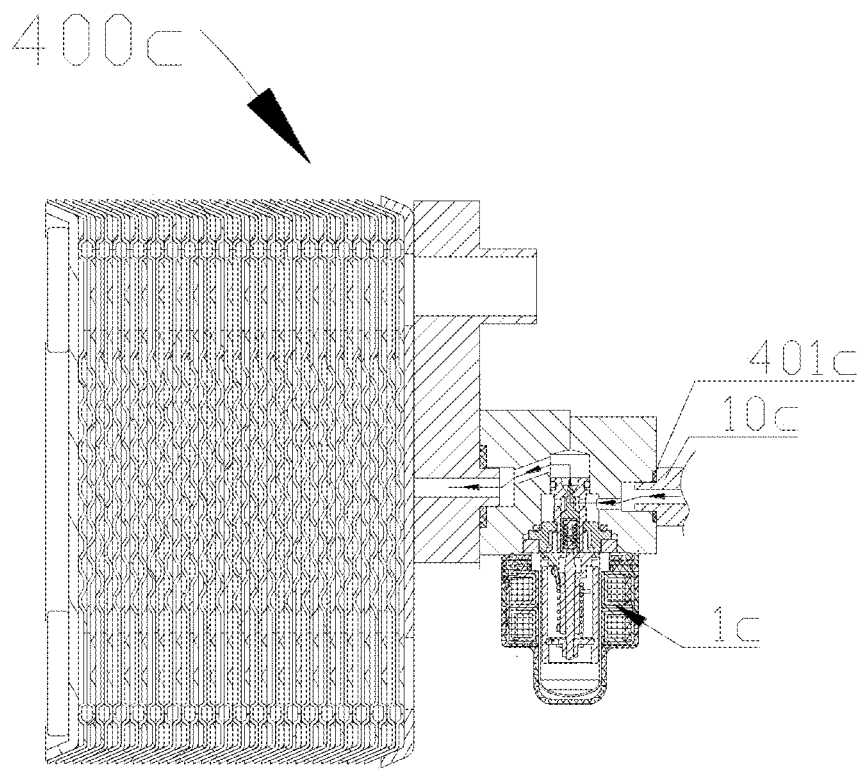
FIG. 16 is a schematic sectional view of the thermal management assembly according to a fourth embodiment of the present disclosure.
Figure 17:
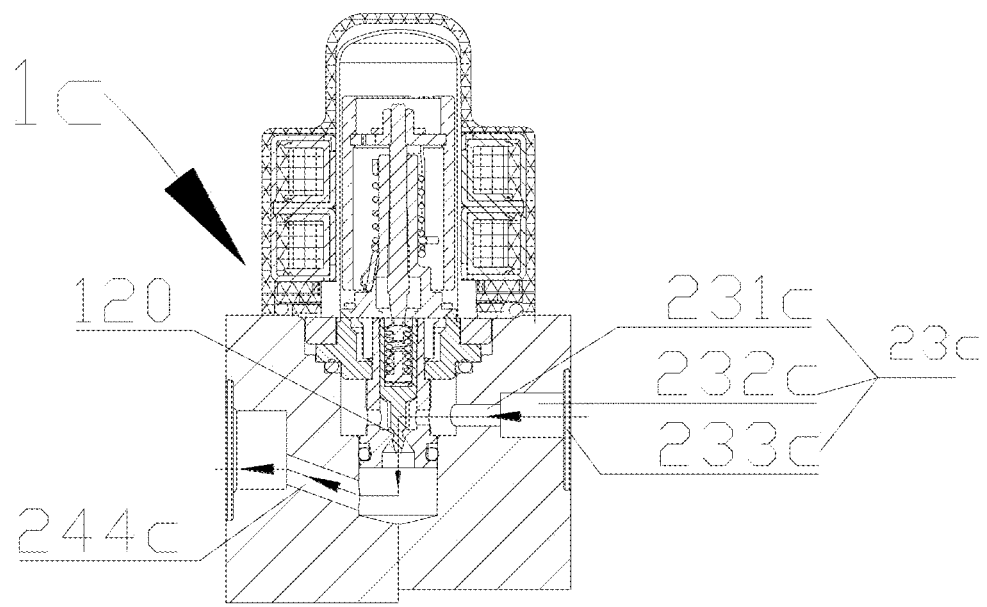
FIG. 17 is a schematic sectional view of the electronic expansion valve in FIG. 16.

Referring to FIG. 16, FIG. 16 is a schematic structural view of the thermal management assembly of the fourth embodiment in the technical solution. FIG. 17 is a schematic structural view of the electronic expansion valve in FIG. 16. The structure of the electronic expansion valve of the fourth embodiment will be described in detail below.

Referring to FIGS. 16 and 17, a first flow portion 23c includes a first subsection 231c and a first connection section 232c, the first connection section 232c is in direct communication with the first subsection 231c, and the first subsection 231c is closer to the valve port 120 than the first connection section 232c. The first subsection 231c and the first connection section 232c are located above the valve port 120, the first connection section 232c is configured to connect with an external connection pipe 10c, and a flow cross-sectional area of the first subsection 231c is greater than the flow cross-sectional area of the valve port 120, which prevents the working medium from being throttled at the first subsection 231c and the flow from being adversely affected. Besides, a flow cross-sectional area of the first connection section 232c is greater than a flow cross-sectional area of the first subsection 231c, which is beneficial to reducing the flow resistance. In this embodiment, the first subsection 231c and the first connection section 232c are sections with different diameters.

Referring to FIGS. 16 and 17, the first flow portion 23c further includes a first accommodating portion 233c, and the first accommodating portion 233c is in communication with the first connection section 232c. A diameter of the first accommodating portion 233c is greater than a diameter of the first connection section 232c. With reference to FIG. 16, the first accommodating portion 233c is configured to place a first sealing ring 401c, to prevent the working medium from leaking at the connection between the first flow portion 23c and the external connection pipe 10c.

Compared with the thermal management assembly and the electronic expansion valve of the third embodiment, in this embodiment, the first subsection 231c and the first connection section 232c are sections with different diameters. In this embodiment, as for other structures of the electronic expansion valve, reference may be made to the electronic expansion valve of the third embodiment, which will not be repeated here.

Figure 18:
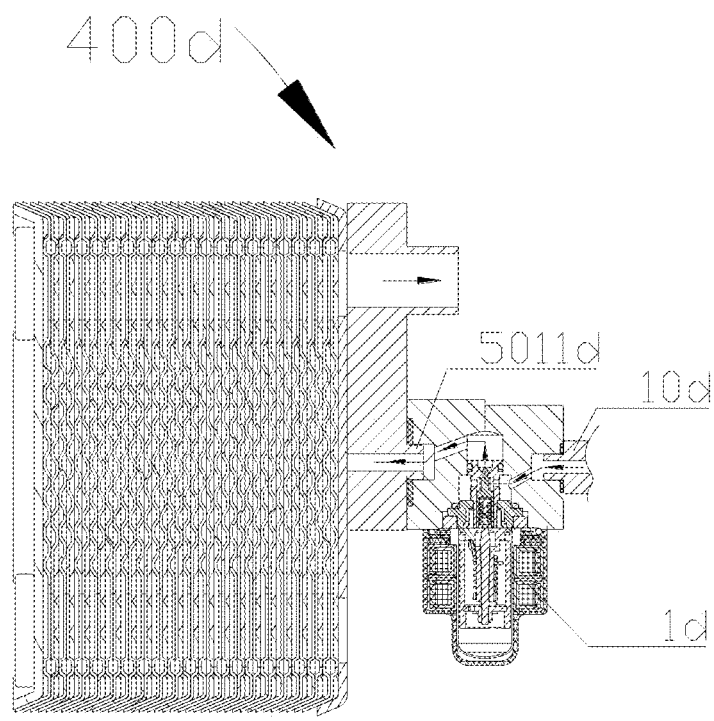
FIG. 18 is a schematic sectional view of the thermal management assembly according to a fifth embodiment of the present disclosure.
Figure 19:
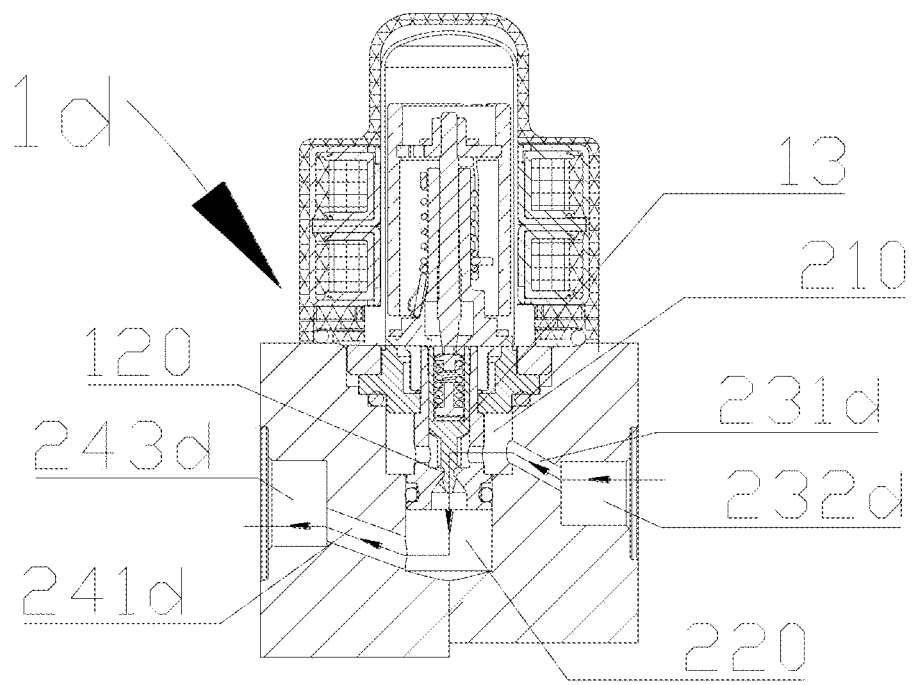
FIG. 19 is a schematic sectional view of the electronic expansion valve in FIG. 18.

Referring to FIG. 18, FIG. 18 is a schematic structural view of the thermal management assembly of the fifth embodiment in the technical solution. FIG. 19 is a schematic structural view of the electronic expansion valve in FIG. 18. The structure of the electronic expansion valve of the fifth embodiment will be described in detail below.

Referring to FIGS. 18 and 19, an electronic expansion valve 1d includes a first flow portion 23d and a second flow portion 24d. The working medium in the first flow portion 23d is able to communicate with the working medium in the second flow portion 24d. In this embodiment, at least part of the first flow portion 23d is located above the valve port 120, and at least part of the second flow portion 24d is located below the valve port 120. The first flow portion 23d includes a first subsection 231d and a first connection section 232d, the first subsection 231d is in communication with the first connection section 232d, the first connection section 232d is configured to connect with an external connection pipe 10d, and the first subsection 231d is in communication with the first cavity 210. The second flow portion 24d includes a second subsection 241d and a second connection section 243d, the second subsection 241d is in communication with the second connection section 243d, the second connection section 243d is configured to connect with a connection pipe 5011d of an adapter. A first cross section is obtained by cutting the electronic expansion valve 1d along a section plane which passes through the center line of the valve core 13 and flow paths of the working medium in the first flow portion 23d and the second flow portion 24d. In a center line of the first subsection 231d, part of the center line located in the first subsection 231d is defined as a first line. In a center line of the second subsection 241d, part of the center line located in the second subsection 241d is defined as a second line. On the first cross section, an angle clockwise formed between the first line and the center line of the valve core and an angle clockwise formed between the second line and the center line of the valve core are acute angles. With such inclined arrangement of the first subsection 231d and the second subsection 241d, the first flow portion 23d can be communicated with the first cavity 210, and the second flow portion 24d can be communicated with the second cavity 220, so that the working medium flows into the first cavity 210 through the first flow portion 26d, and then flows into the second cavity 220 after being throttled at the valve port 120, and the working medium in the second cavity 220 flows out from the second flow portion part 24d. Therefore, while the relative positions of the connection pipe 5011' of the adapter and the connection pipe 10' of the external system in FIG. 1 are kept unchanged, the electronic expansion valve is able to replace the conventional thermal expansion valve and be further matched and assembled with the connection pipe 5011' of the adapter and the connection pipe 110' of the external system in FIG. 1 by adjusting the positions of the first flow portion 23d and the second flow portion 24d, which also improves the flow control accuracy.

Compared with the thermal management assembly and the electronic expansion valve of the first embodiment, in this embodiment, on the first cross section, an angle clockwise formed between the first line and the center line of the valve core 13 and an angle clockwise formed between the second line and the center line of the valve core 13 are acute angles. Compared with the thermal management assembly and the electronic expansion valve of the first embodiment, in this embodiment, the first subsection 232d and the second subsection 243d are arranged closer to each other, so that the electronic expansion valve is able to replace the conventional thermal expansion valve and be further matched and assembled with the connection pipe 5011' of the adapter and the connection pipe 110' of the external system in FIG. 1. In this embodiment, as for other structures of the electronic expansion valve, reference may be made to the electronic expansion valve of the first and third embodiments, which will not be repeated here.

Figure 20:
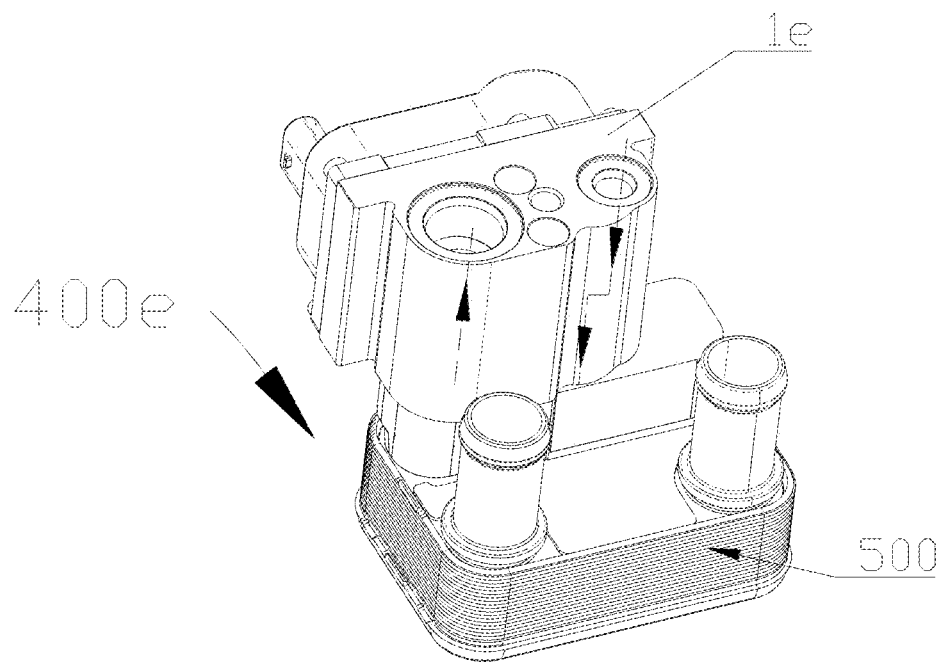
FIG. 20 is a schematic sectional view of the thermal management assembly according to a sixth embodiment of the present disclosure.
Figure 21:
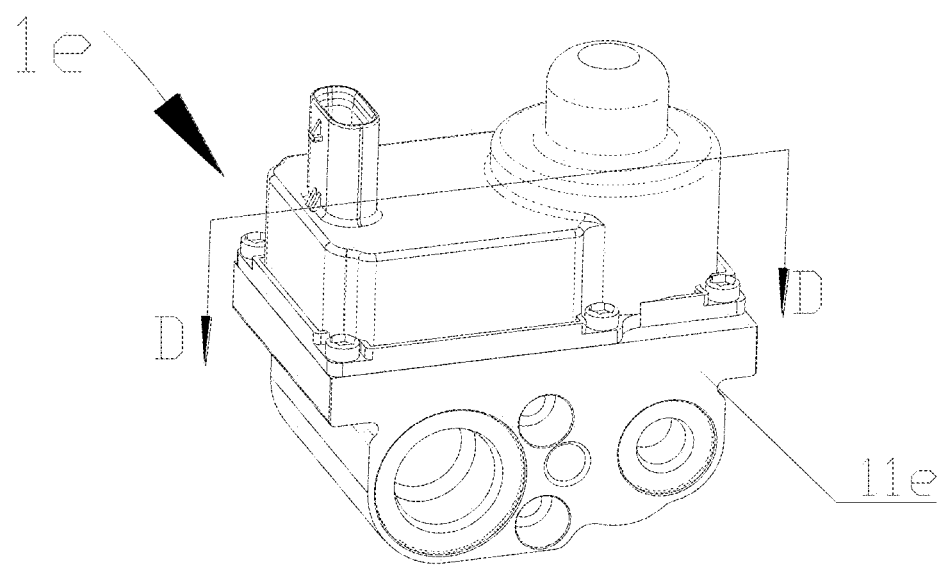
FIG. 21 is a schematic perspective view of the electronic expansion valve in FIG. 20.
Figure 22:
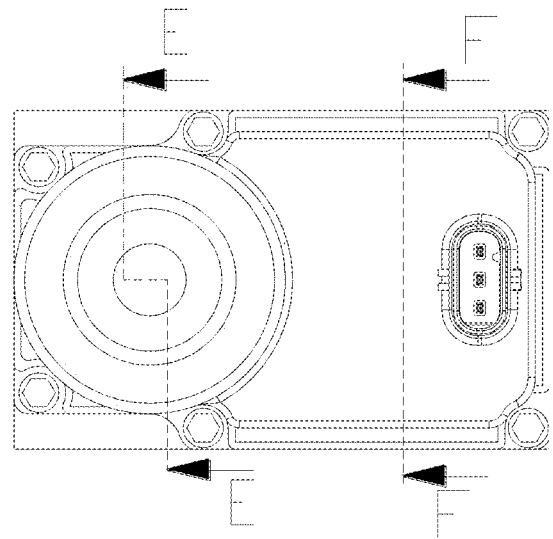
FIG. 22 is a schematic front view of the electronic expansion valve in FIG. 21.

Referring to FIG. 20, FIG. 20 is a schematic structural view of the thermal management assembly of the sixth embodiment in the technical solution. FIGS. 21 to 25 are schematic structural views of the electronic expansion valve in FIG. 20. The structure of the electronic expansion valve of the sixth embodiment will be described in detail below.

Figure 23:
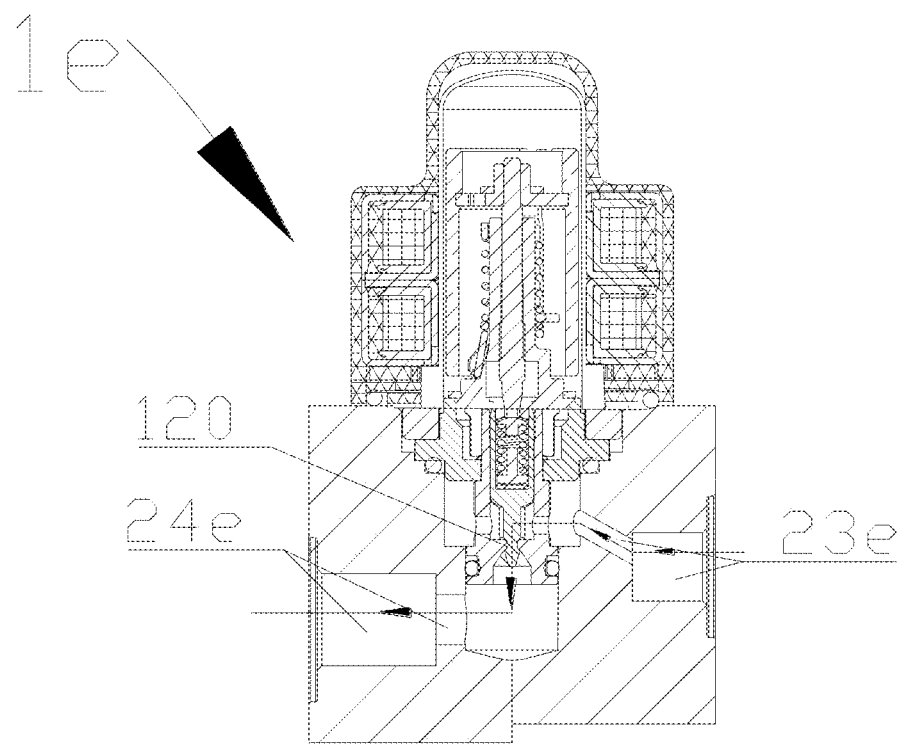
FIG. 23 is a sectional view of the electronic expansion valve in FIG. 22 taken along line E-E.
Figure 24:
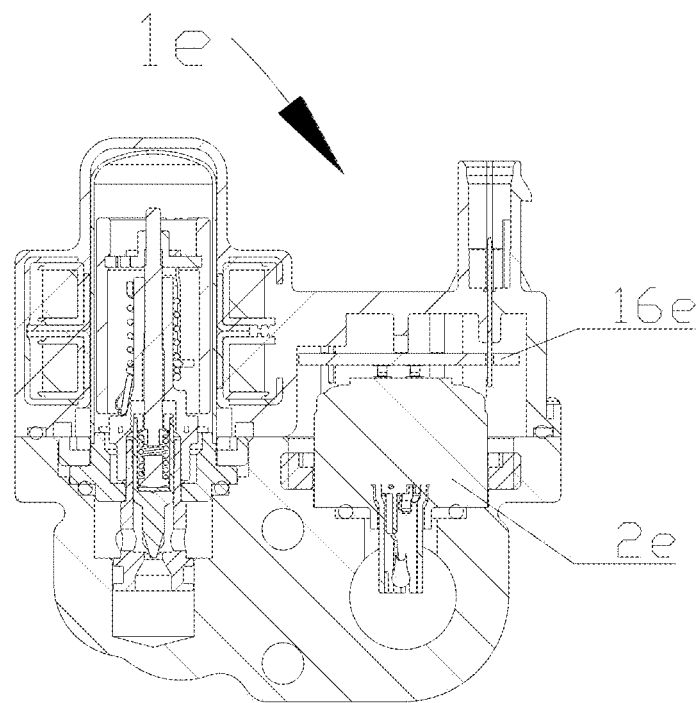
FIG. 24 is a sectional view of the electronic expansion valve in FIG. 21 taken along line D-D.
Figure 25:
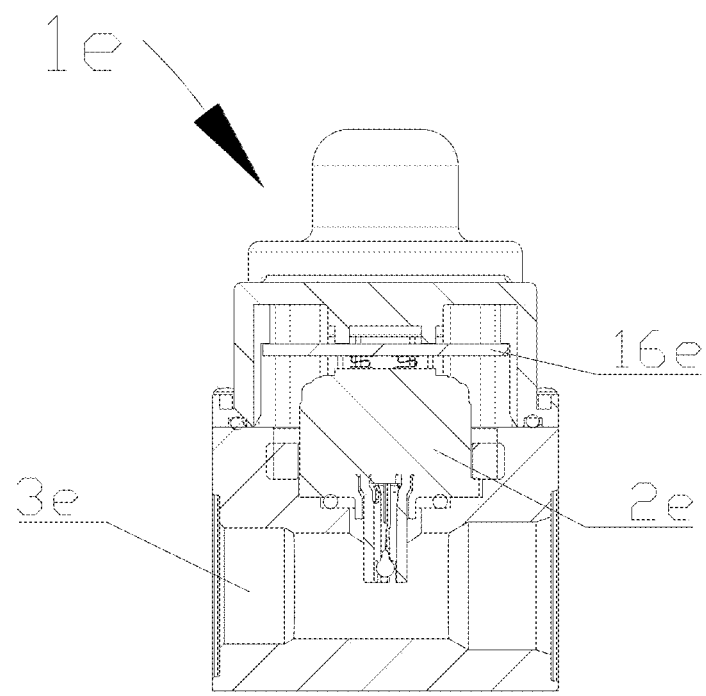
FIG. 25 is a sectional view of the electronic expansion valve in FIG. 22 taken along line F-F.

Referring to FIGS. 20 to 25, an electronic expansion valve 1e further includes a valve body 11e. A first flow portion 23e and a second flow portion 24e are formed in the valve body 11e. The electronic expansion valve 1e further includes a sensor 2e, and the sensor 2e is fixed and position-limited to the valve body 11e. The sensor 2e is electrically and/or signal connected with a circuit board 16e. The valve body 11e further includes a first flow channel 3e, the first flow channel 3e is not in communication with the first flow portion 23e or the second flow portion 24e. At least part of the sensor 2e is extended into the first flow channel 3e, and the sensor 2e is configured to detect the pressure and/or temperature of the working medium in the first flow channel 3e, so that the sensor 2e and the electronic expansion valve 1e are integrated and assembled together, which is beneficial to improving the integration of the system. With reference to FIGS. 20 and 23, the working medium flows in through the first flow portion 23e, and the working medium after being throttled by the valve port 120 then flows into the heat exchanger 500 from the second flow portion 24e, and the working medium after the heat exchange then flows out through the first flow channel 3e. In this embodiment, the sensor 2e is configured to detect the temperature and/or pressure of the working medium on an outlet side of the heat exchanger. Since the sensor 2e is electrically and/or signal connected with the circuit board 16e, the sensor 2e is able to transmit the collected temperature and/or pressure signals to the circuit board 16e, and the circuit board 16e adjusts the opening degree of the electronic expansion valve 1e according to a corresponding control program after obtaining related parameters. Compared with the thermal management assembly and the electronic expansion valve of the second embodiment, in this embodiment, the sensor 2e and the electronic expansion valve 1e are integrated and assembled together, which is beneficial to improving the integration of the system.

In the electronic expansion valve of the sixth embodiment, the structures of the first flow portion and the second flow portion in the second embodiment are used. Apparently, the structures of the first flow portion and the second flow portion in the second embodiment to the fifth embodiment are also applicable to this embodiment, which will not be repeated here.

It should be noted that, the above embodiments are only intended to illustrate the present disclosure and not to limit the technical solutions described in the present disclosure. Although the present specification has been described in detail with reference to the embodiments described above, it should be understood by those skilled in the art that, various modifications and equivalents can be made to the technical solutions of the present disclosure without departing from the spirit and scope of the present disclosure, all of which should be contained within the scope of the claims of the present disclosure.

The invention claimed is:

1. An electronic expansion valve, comprising a valve body, a valve core, a rotor assembly, a stator assembly and a circuit board, wherein the stator assembly is located on an outer circumference of the rotor assembly, and the stator assembly is electrically connected to the circuit board;

the electronic expansion valve has a valve port, and the valve core is configured to move with respect to the valve port to adjust an opening degree of the valve port;

the valve body comprises a first flow portion and a second flow portion, at least part of the first flow portion is located above the valve port, and at least part of the second flow portion is located below the valve port;

the valve body has a first cavity and a second cavity, the first cavity is located above the valve port, and the second cavity is located below the valve port, the first flow portion is in communication with the first cavity, and the second flow portion is in communication with the second cavity;

the first flow portion comprises a first connection section and a first subsection, the first connection section is configured to connect with an external connection pipe, and the first subsection is in direct communication with the first cavity;

the second flow portion comprises a second connection section and a second subsection, the second connection section is configured to connect with an external connection pipe, and the second subsection is in direct communication with the second cavity;

in a center line of the first subsection, part of the center line located in the first subsection is defined as a first line, and in a center line of the second subsection, part of the center line located in the second subsection is defined as a second line;

a first cross section is obtained by cutting the electronic expansion valve along a section plane which passes through a center line of the valve core, wherein flow paths of a working medium in the first flow portion and the second flow portion lie in the first cross section, and on the first cross section, an angle clockwise formed between at least one of the first line and the second line and the center line of the valve core is an acute angle.

2. The electronic expansion valve according to claim 1, wherein the first subsection is in direct communication with the first connection section, the first subsection is closer to the valve port than the first connection section, and a flow cross-sectional area of the first connection section is greater than a flow cross-sectional area of the first subsection; and on the first cross section, an angle clockwise formed between the first line and the center line of the valve core is an acute angle.

3. The electronic expansion valve according to claim 1, wherein the second subsection is in direct communication with the second connection section, the second subsection is closer to the valve port than the second connection section, and a flow cross-sectional area of the second connection section is greater than a flow cross-sectional area of the second subsection; and on the first cross section, an angle clockwise formed between the second line and the center line of the valve core is an acute angle.

4. The electronic expansion valve according to claim 2, wherein the flow cross-sectional area of the first subsection is greater than a flow cross-sectional area of the valve port; and on the first cross section, an extension line of the first subsection extending toward the first connection section does not intersect the first connection section.

5. The electronic expansion valve according to claim 4, wherein a flow cross-sectional area of the second subsection is greater than the flow cross-sectional area of the valve port, a flow cross-sectional area throughout the second connection section is equal to the flow cross-sectional area throughout the second subsection, the second connection section and the second subsection are the same section, and the second connection section and the second subsection are located below the valve port.

6. The electronic expansion valve according to claim 4, wherein a flow cross-sectional area of the second subsection is greater than the flow cross-sectional area of the valve port, the second connection section is in communication with the second subsection, the second subsection is closer to the valve port than the second connection section, a flow cross-sectional area of the second connection section is greater than the flow cross-sectional area of the second subsection, the second connection section and the second subsection are sections with different diameters, and the second connection section and the second subsection are located below the valve port.

7. The electronic expansion valve according to claim 3, wherein the flow cross-sectional area of the second subsection is greater than a flow cross-sectional area of the valve port; and on the first cross section, an extension line of the second subsection extending toward the second connection section does not intersect the second connection section.

8. The electronic expansion valve according to claim 7, wherein the flow cross-sectional area of the first subsection is greater than the flow cross-sectional area of the valve port, the flow cross-sectional area throughout the first connection section is equal to the flow cross-sectional area throughout the first subsection, the first connection section and the first subsection are the same section, and the first connection section and the first subsection are located above the valve port.

9. The electronic expansion valve according to claim 7, wherein the flow cross-sectional area of the first subsection is greater than the flow cross-sectional area of the valve port, the first connection section is in communication with the first subsection, the first subsection is closer to the valve port than the first connection section, the flow cross-sectional area of the first connection section is greater than the flow cross-sectional area of the first subsection, the first connection section and the first subsection are sections with different diameters, and the first connection section and the first subsection are located above the valve port.

10. The electronic expansion valve according to claim 1, wherein the valve body comprises a first wall surface and a second wall surface, and the first wall surface and the second wall surface are opposite to each other; the first connection section is perpendicular to the first wall surface, the second connection section is perpendicular to the second wall surface, and the flow cross-sectional area of the first subsection is smaller than the flow cross-sectional area of the second subsection.

11. The electronic expansion valve according to claim 1, wherein the electronic expansion valve further comprises a sensor, the sensor is fixed and position-limited to the valve body, the sensor is electrically and/or signal connected with the circuit board, the valve body further comprises a first flow channel, the first flow channel is not in communication with the first flow portion or the second flow portion, at least part of the sensor is extended into the first flow channel, and the sensor is configured to detect a pressure and/or temperature of the working medium in the first flow channel.

12. The electronic expansion valve according to claim 10, wherein the electronic expansion valve further comprises a sensor, the sensor is fixed and position-limited to the valve body, the sensor is electrically and/or signal connected with the circuit board, the valve body further comprises a first flow channel, the first flow channel is not in communication with the first flow portion or the second flow portion, at least part of the sensor is extended into the first flow channel, and the sensor is configured to detect a pressure and/or temperature of the working medium in the first flow channel.

13. A thermal management assembly, comprising an electronic expansion valve and a heat exchanger, wherein the electronic expansion valve is fixedly connected to the heat exchanger, and the electronic expansion valve is the electronic expansion valve according to claim 1.

* * * * *